United States Patent [19]

Jordan et al.

[11] Patent Number: 4,801,166
[45] Date of Patent: Jan. 31, 1989

[54] GRATE HANDLE

[76] Inventors: Cindy Jordan; Alan Jordan, both of 19760 NE. 10th Ave., North Miami Beach, Fla. 33179

[21] Appl. No.: 148,006

[22] Filed: Jan. 25, 1988

[51] Int. Cl.⁴ .............................................. A47J 45/10
[52] U.S. Cl. .......................................... 294/9; 294/10
[58] Field of Search ...................... 294/9, 10, 11, 7, 3, 294/2, 12, 13, 14, 15, 92, 27.1

[56] References Cited

U.S. PATENT DOCUMENTS 269,767  12/1982  Wilson ................................. 294/10
4,471,985 9/1984  Mahoney ............................. 294/10

FOREIGN PATENT DOCUMENTS 1133779 10/1982 Canada ................................. 294/9

Primary Examiner—James B. Marbert
Attorney, Agent, or Firm—Herbert L. Lerner; Laurence A. Greenberg

[57] ABSTRACT

A grate handle includes a handle body having a longitudinal axis. The handle body has a first slot formed therein being wider than a bar of a grate and being elongated in a direction substantially parallel to the longitudinal axis, whereby a bar of a grate may be inserted in the first slot for pushing a grate. The grate handle also has a second slot formed therein being wider than a bar of a grate and being elongated in a direction substantially transverse to the longitudinal axis, whereby a bar of a grate may be inserted in the second slot for pulling a grate.

5 Claims, 1 Drawing Sheet

GRATE HANDLE

The invention relates to a grate handle to be used for inserting and extracting a grate for supporting objects.

Grates are found in household ovens and barbecues for supporting cooking utensils and food and in industrial ovens for supporting objects to be heated or holders for such objects. Grates are also used in many other locations where items are to be supported without using a solid shelf. Examples of such other uses are for supporting paper in copying machines and printers.

A grate normally has an outer bar forming the outer boundary of the grate and inner bars connected between points on the outer bar for supporting the objects, as mentioned above.

In the past, oven grates have been inserted and extracted by placing a cloth or a glove around the hand of the oven operator. However, if the grate is very hot or if the cloth slips, the hand can still be burned. Additionally, a cloth or glove is often not available and is always cumbersome to use when cooking. In non-oven applications, a grate is often at a location which is not easily reached by the hand.

U.S. Pat. No. 102,785 discloses fire tongs having two legs which are interconnected at a pivot point. One of the legs has a curved end for hooking onto and lifting vessels from a fire.

U.S. Pat. No. 1,036,401 discloses a combination clinker bar and fire rake having a shaft which is disposed in a tubular sleeve and which has a tool head at one end thereof. Notches in the sleeve interact with a pin on the shaft in order to lock the tool head in various positions.

Neither of these prior art devices are specifically constructed for inserting or extracting a grate. The tongs shown in U.S. Pat. No. 102,785 could be hooked around one of the bars of the grate for extraction, but only after the legs were spread apart and closed again around the bar. The same procedure would be necessary for removal of the tongs. The tongs could not be used to insert the grate without the danger of the tongs slipping on the grate.

The clinker bar and fire rake of U.S. Pat. No. 1,036,401 could slip if used to insert or extract a grate.

It is accordingly an object of the invention to provide a grate handle, which overcomes the hereinafore-mentioned disadvantages of the heretofore-known devices of this general type and which can be used to insert or extract a grate without the possibility of slippage.

With the foregoing and other objects in view there is provided, in accordance with the invention, a grate handle, comprising a handle body having a longitudinal axis, the handle body having a first slot formed therein being wider than a bar of a grate and being elongated in a direction substantially parallel to the longitudinal axis, whereby a bar of a grate may be inserted in the first slot for pushing a grate, and the grate handle having a second slot formed therein being being wider than a bar of a grate and being elongated in a direction substantially transverse to the longitudinal axis, whereby a bar of a grate may be inserted in the second slot for pulling a grate. The use of elongated slots eliminates any chance of the handle slipping off the grate.

In accordance with another feature of the invention, the grate handle has two ends and both of the slots are formed in one of the ends. This feature makes it easy to extract and insert the grate without turning the handle around.

In accordance with a further feature of the invention, the handle body has a hole formed in the other of the ends for hanging the handle body. In this way, the handle can be kept near the oven or machine on which it is to used.

In accordance with a added feature of the invention, the handle body has a central portion between the ends having a reduced width. Due to this feature, a grip is formed on the handle body.

In accordance with a concomitant feature of the invention, the handle body is formed of wood. It has been found that wood is the best material to be used since it does not melt or burn as easily as plastic and it is lighter and less heat conductive than metal.

Other features which are considered as characteristic for the invention are set forth in the appended claims.

Although the invention is illustrated and described herein as embodied in a grate handle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
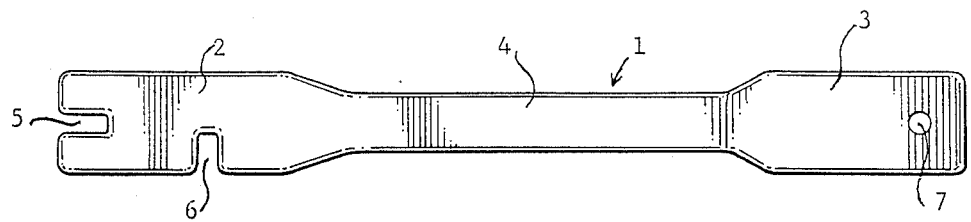
FIG. 1 is a diagrammatic, side-elevational view of the grate handle according to the invention.

Referring now to the figures of the drawings in detail and first, particularly, to FIG. 1 thereof, there is seen a handle body 1 of a grate handle according to the invention. The handle body is approximately 15¾" long, 1¾" wide and ¼" thick when used for a household oven. The handle body is preferably formed of wood because it is more difficult to melt and burn than most plastics, because it is lighter and less heat conductive than most metals and because it is less expensive than either of these materials Furthermore, wood can be given many different finishes. However, it is also contemplated to form the handle of metal such as aluminum with a grip in the form of a covering on one end.

The handle body has a first end 2, a second end 3 and a central portion 4 between the ends having a reduced width. The shape of the handle makes it easier to grasp for operator or user of the handle.

A first slot 5 which is elongated in a direction parallel to the longitudinal axis of the handle body 1 is formed in the first end 2. A second slot 6 which is elongated in a direction transverse to the longitudinal axis of the handle body 1 is also formed in the first end 2. The slots could be formed in different ends, but the device is most easily used when the slots are in the same end. A hole 7 is formed in the second end 3 of the handle body 1 for hanging the handle when not in use.

Figure 2:
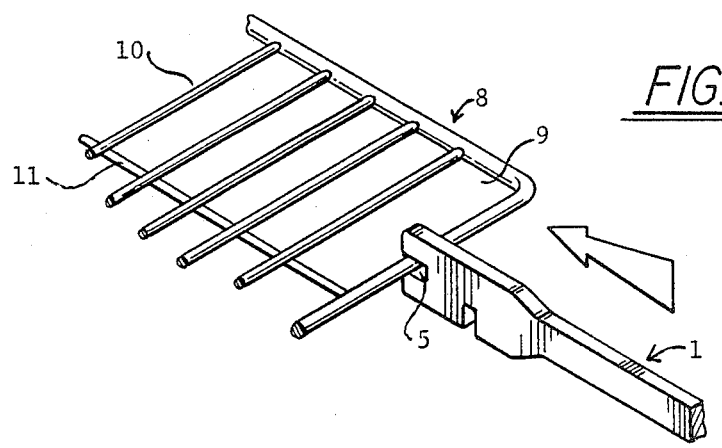
FIG. 2 is a fragmentary, perspective view of the grate handle of FIG. 1 in the insertion position on a grate.

FIG. 2 illustrates a grate having an outer bar 9 which may be one piece as shown or may be formed of two or more pieces. Inner bars 10 and 11 are connected to different points on the outer bar 9 in order to support objects, such as cooking utensils. It can be seen that the handle body 1 is in engagement with the grate 8 in such a manner that the outer bar 9 passes through the first slot 5. In this way, the grate is pushed or is inserted in the direction of the arrow, such as into an oven.

Figure 3:
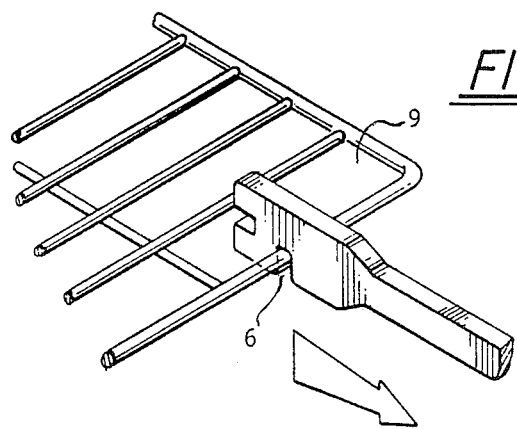
FIG. 3 is a view similar to FIG. 2 of the grate handle of FIG. 1 in the extraction position on a grate.

In FIG. 3, the outer bar 9 passes through the second slot 6 for pulling or for extraction, such as out of an oven, in the direction of the arrow.

Naturally, the slots need not be exactly parallel and transverse to the longitudinal axis, as long as any angle used will not prevent the the bars of the grate from remaining in the slots when pushing and pulling the grate.

It is believed to be clear that the handle body 1 is very unlikely to slip on the grate 8 because the locations and orientations of the slots always places part of the handle body 1 on each side of the bar 9. The likelihood of slippage is also reduced due of the depth of the slots and because the bars 11 limit the movement of the handle body in both lateral directions.

We claim:

1. Grate handle, comprising a handle body having a longitudinal axis, said handle body having a first slot formed therein with a substantially uniform width being wider than a bar of an oven grate and being substantially horizontal and elongated in substantially the same direction as said longitudinal axis forming means for horizontally pushing an oven grate having a bar inserted in said first slot, and said grate handle having a second slot formed therein with a substantially uniform width being wider than a bar of an oven grate and being substantially vertical and elongated in a direction substantially perpendicular to said longitudinal axis forming means for horizontally pulling an oven grate having a bar inserted in said second slot.

2. Grate according to claim 1, wherein said grate handle has two ends and both of said slots are formed in one of said ends.

3. Grate according to claim 2, wherein said handle body has a hole formed in the other of said ends for hanging said handle body.

4. Grate according to claim 1, wherein said handle body has a central portion between said ends having a reduced width.

5. Grate according to claim 1, wherein said handle body is formed of wood.

* * * * *